United States Patent
Sparks et al.

(10) Patent No.: US 7,568,399 B2
(45) Date of Patent: Aug. 4, 2009

(54) MICROFLUIDIC DEVICE

(75) Inventors: Douglas Ray Sparks, Whitmore Lake, MI (US); Nader Najafi, Ann Arbor, MI (US)

(73) Assignee: Integrated Sensing Systems, Inc., Ypsilanti, MI (US)

(*) Notice: Subject to any disclaimer, the term of this patent is extended or adjusted under 35 U.S.C. 154(b) by 454 days.

(21) Appl. No.: 11/620,411

(22) Filed: Jan. 5, 2007

(65) Prior Publication Data

US 2007/0151335 A1    Jul. 5, 2007

Related U.S. Application Data

(60) Provisional application No. 60/756,202, filed on Jan. 5, 2006.

(51) Int. Cl.
*G01F 1/82* (2006.01)
(52) U.S. Cl. .............................. 73/861.355; 73/204.26
(58) Field of Classification Search ............ 73/861.355, 73/204.26, 204.25
See application file for complete search history.

(56) References Cited

U.S. PATENT DOCUMENTS

| | | | |
|---|---|---|---|
| 6,477,901 B1 | 11/2002 | Tadigadapa et al. | |
| 6,647,778 B2 | 11/2003 | Sparks | |
| 6,942,169 B2 | 9/2005 | Sparks | |
| 7,228,735 B2 * | 6/2007 | Sparks et al. ............ | 73/204.26 |
| 2006/0175303 A1 | 8/2006 | Sparks et al. | |
| 2006/0213552 A1 | 9/2006 | Sparks et al. | |

OTHER PUBLICATIONS

D. Sparks, et al; "A CMOS Integrated Surface Micromachined Angular Rate Sensor"; Transducers '97; p. 851; 1997.
C. Cabuz, et al.; "Fabrication and Packaging of a Resonant IR Sensor Integrated Into Silicon"; Sensors and Actuators, 43, p. 92, 1994.
C. Nguyen and W. Kaiser; "CMOS Micromechanical Resonator Oscillator"; IEDM 93; p. 199; 1993.
D. Sparks, et al; "Wafter-to Wafter Bonding of Nonplanarized MEMS Surfaces Using Solder"; Journal of Micromechanics and Microengineering; 11; p. 1; 2001.
D. Sparks, et al; "Chip-scale Packaging of a Gyroscope Using Wafer Bonding"; Sensors and Materials, 11; p. 197; 1999.
D. Sparks, et al; "Chip-Level Vacuum Packaging of Micromachines Using NanoGetters"; IEEE Transactions on Advanced Packaging; vol. 26, No. 3; pp. 277-282; Aug. 2003.

* cited by examiner

*Primary Examiner*—Jewel Thompson
(74) *Attorney, Agent, or Firm*—Hartman & Hartman, P.C.; Gary M. Hartman; Domenica N.S. Hartman

(57) ABSTRACT

A microfluidic device a micromachined freestanding member adapted to sense one or more properties of a fluid flowing through the freestanding member. The freestanding member is supported by a substrate and spaced apart and separated from the substrate to enable the freestanding member to move relative to the substrate under the influence of a vibration-inducing element. Movement of the freestanding member relative to the substrate is then sensed by a sensing element. The freestanding member has an inlet, an outlet, an internal passage that fluidically couples the inlet and outlet, and a wall that defines and separates first and second passage portions of the internal passage that are arranged in fluidic series so that a fluid flowing through the internal passage flows through the first and second passage portions in opposite directions.

21 Claims, 6 Drawing Sheets

MICROFLUIDIC DEVICE

CROSS REFERENCE TO RELATED APPLICATIONS

This application claims the benefit of U.S. Provisional Application No. 60/756,202 filed Jan. 5, 2006, the contents of which are incorporated herein by reference.

BACKGROUND OF THE INVENTION

The present invention generally relates to micromachining devices and processes for their fabrication. More particularly, this invention relates to a microfluidic device having a compact micromachined freestanding member configured to sense one or more properties of a fluid flowing through an internal passage within the freestanding member.

FIGS. 1 and 2 represent a Coriolis-based fluid sensing device 10 of a type disclosed in commonly-assigned U.S. Pat. No. 6,477,901 to Tadigadapa et al., whose contents relating to the fabrication and operation of a Coriolis-based sensor are incorporated herein by reference. The fluid sensing device 10 is represented as including a substrate 12 that may be formed of silicon or another semiconductor material, quartz, glass, ceramic, metal, a polymeric material, a composite material, etc. A tube 14 is supported by the substrate 12 so as to have a base 28 attached to a surface 18 of the substrate 12 and a freestanding portion 16 suspended above the substrate 12. As evident from FIG. 1, the freestanding portion 16 has a generally U or D-shaped configuration. Electrodes 22 and 24 are located on the substrate 12 beneath the freestanding portion 16 of the tube 14, and bond pads 32 (only one of which is shown) are provided for transmitting input and output signals to and from the device 10. The electrode 22 can be, for example, capacitively coupled to the tube 14 for capacitively (electrostatically) driving the freestanding portion 16 at or near resonance, while the remaining electrodes 24 sense (e.g., capacitively) the deflection of the tube 14 relative to the substrate 12 and provide feedback to enable the vibration frequency induced by the drive electrode 22 to be controlled with appropriate circuitry. With a fluid entering the device 10 through an inlet port 26 and flowing through an internal passage 20 within the tube 14, the freestanding portion 16 can be vibrated at or near resonance to ascertain certain properties of the fluid, such as flow rate and density, using Coriolis force principles. Notable advantages of the device 10 include the extremely miniaturized scale to which it can be fabricated and its ability to precisely analyze very small quantities of fluids. In FIG. 2, the device 10 is schematically shown as enclosed by a cap 30 to allow for vacuum packaging that further improves the performance of the device 10 by reducing air damping effects.

Tadigadapa et al., commonly-assigned U.S. Pat. No. 6,647,778 to Sparks, and commonly assigned U.S. Patent Application Publication No. 2006/0175303 to Sparks et al. disclose processes for fabricating flow sensing devices of the type shown in FIGS. 1 and 2 using micromachining techniques. As used herein, micromachining is a technique for forming very small elements by bulk etching a substrate (e.g., a silicon wafer), and/or by surface thin-film etching, the latter of which generally involves depositing a thin film (e.g., polysilicon or metal) on a sacrificial layer (e.g., oxide layer) on a substrate surface and then selectively removing portions of the sacrificial layer to free the deposited thin film. As disclosed by Tadigadapa et al., Sparks, and Sparks et al., wafer bonding and silicon etching techniques can be used to produce microelectromechanical systems (MEMS) comprising one or more flow sensing devices. Sensors of the type taught by Tadigadapa et al. have found use in a variety of applications, as evident from Sparks, Sparks et al., commonly-assigned U.S. Pat. Nos. 6,932,114, 6,942,169, and 7,059,176, and U.S. Patent Application Publication Nos. 2004/0171983, 2005/0126304, 2005/0235759, 2005/0284815, 2006/0010964, and 2006/0213552. As examples, the teachings of Tadigadapa et al. have been applied to mass flow sensors, density sensors, fuel cell concentration meters, chemical concentration sensors, specific gravity sensors, pressure sensors, temperature sensors, drug infusion devices, and other devices that can employ resonating and stationary microtubes. Nonetheless, further improvements would be desirable for use in the design and fabrication of devices such as Tadigadapa et al. that employ extremely miniaturized fluid channels, including the capability of further reducing the size of such devices.

BRIEF SUMMARY OF THE INVENTION

The present invention provides microfluidic devices, and particularly a microfluidic device with a micromachined freestanding member adapted to sense one or more properties of a fluid flowing through the freestanding member. The microfluidic device preferably operates in a manner similar to the microfluidic devices disclosed in U.S. Pat. Nos. 6,477,901 and 6,647,778, which sense the mass flow and/or density of a fluid flowing through a resonating tube, though other uses and operating techniques are also within the scope of this invention, including microfluidic devices that employ resonating and/or stationary microtubes for other purposes.

According to a first aspect of the invention, the microfluidic device microfluidic device includes a micromachined freestanding member that is supported by a substrate and is spaced apart and separated from the substrate. As such, the freestanding member is able to move relative to the substrate under the influence of a vibration-inducing element associated with the freestanding member. Movement of the freestanding member relative to the substrate is then sensed by a sensing element also associated with the freestanding member. The freestanding member has an inlet, an outlet, an internal passage that fluidically couples the inlet and outlet, and a wall that defines and separates first and second passage portions of the internal passage arranged in fluidic series so that a fluid flowing through the internal passage flows through the first and second passage portions in opposite directions.

With the above construction, the freestanding member can be fabricated, for example, with the wafer bonding and silicon etching techniques of Tadigadapa et al., Sparks, and Sparks et al., and operated as, for example, a resonating fluid passage capable of using Coriolis force principles to detect various properties of a fluid, including but not limited to mass flow and density. Because the wall of the freestanding member is shared by multiple portions of the internal passage, the freestanding member is more compact that previous tube configurations, such as the U-shaped resonating tubes of Tadigadapa et al., as well as omega and D-shaped resonating tubes proposed in the past.

Other objects and advantages of this invention will be better appreciated from the following detailed description.

DETAILED DESCRIPTION OF THE INVENTION

Figure 3:
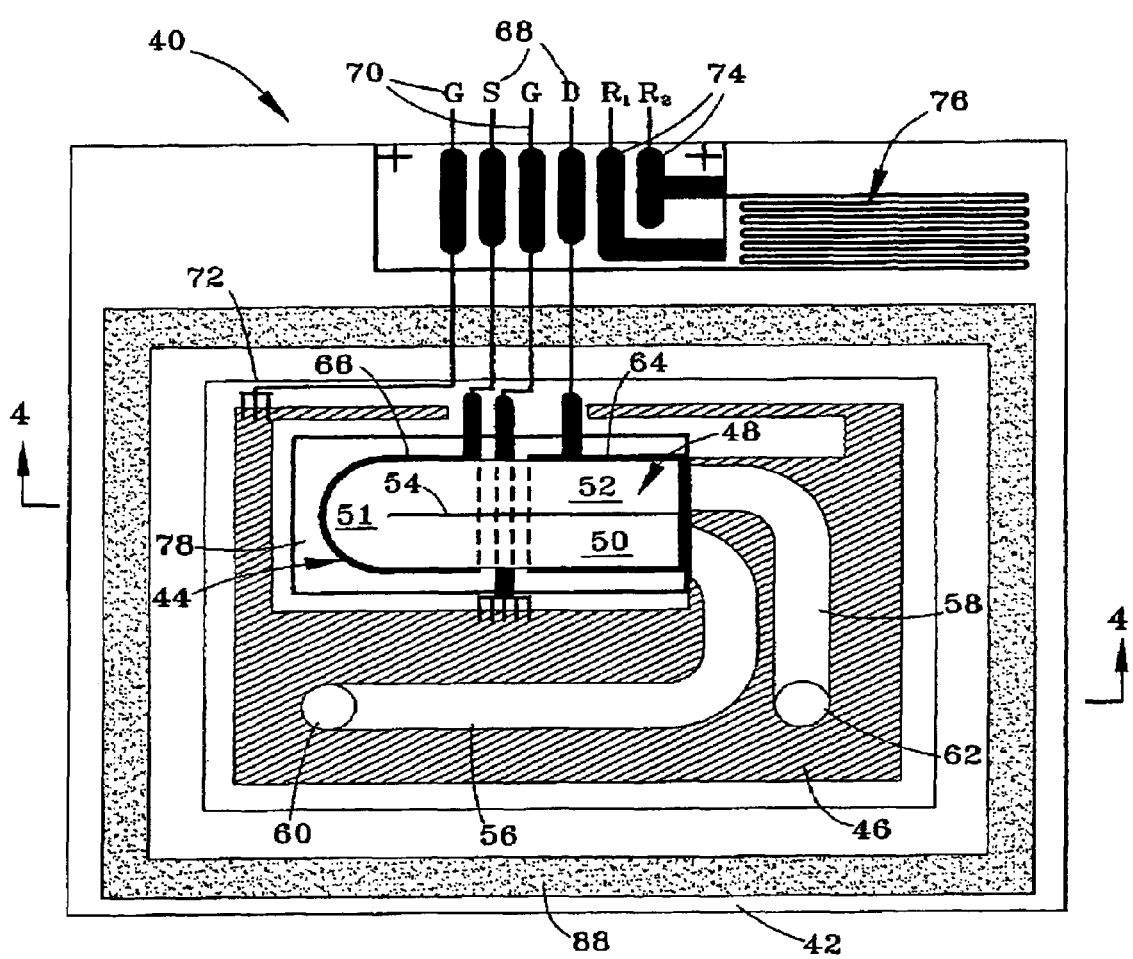
FIG. 3 is a plan view of a microfluidic device in accordance with a first embodiment of this invention.

FIG. 3 represents a microfluidic device 40 whose fabrication, construction, and operating principles can be similar to microfluidic devices disclosed in commonly-assigned U.S. Pat. No. 6,477,901 to Tadigadapa et al., whose contents relating to micromachining techniques and microfluidic device operation are incorporated herein by reference. As such, the device 40 can be fabricated using wafer bonding and silicon etching techniques to produce a microelectromechanical system (MEMS) comprising a suspended micromachined freestanding structure 44 through which fluid flows. However, in contrast to the tube of Tadigadapa et al., the freestanding structure 44 of the device 40 of this invention has an internal passage 48 made up of multiple channels 50 and 52 through which a fluid under evaluation flows. In preferred embodiments, the freestanding structure 44 has an entirely closed configuration such that openings and voids are not present in its exterior, in contrast to the devices taught by Tadigadapa et al. whose U or D-shaped tubes define a large central opening. An advantage of the closed configuration of the freestanding structure 44 of this invention is the improved miniaturization to which it can be fabricated while maintaining the ability to precisely analyze very small quantities of fluids. The compact configuration of the freestanding structure 44 also reduces the amount of structural material required in its construction, thereby increasing the density sensitivity of the device 40.

Figure 1:
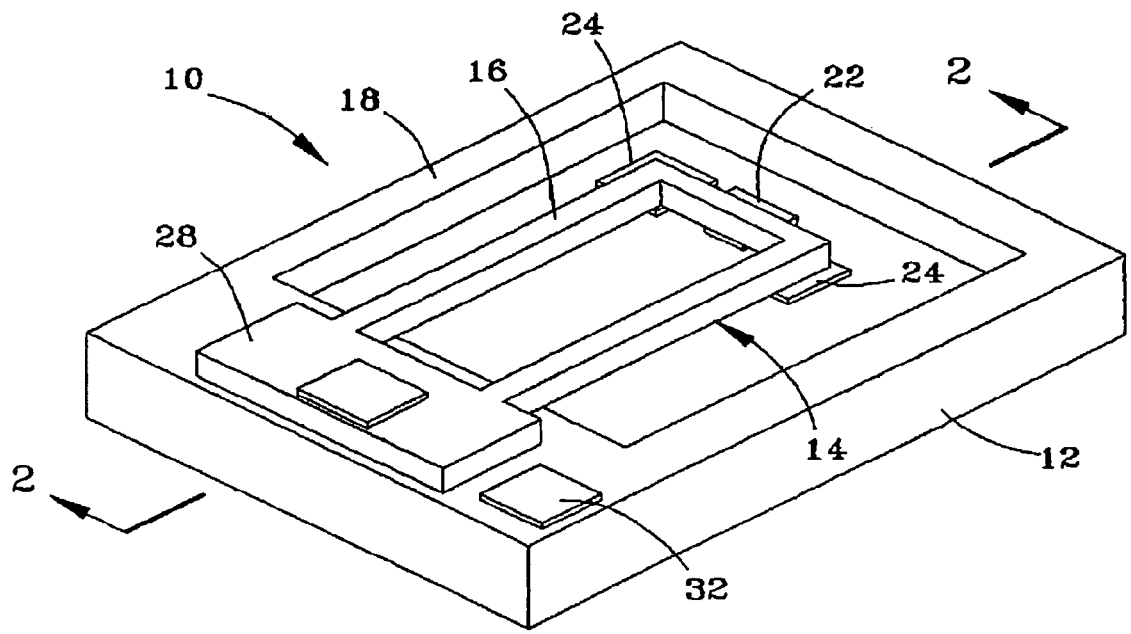
FIGS. 1 and 2 are perspective and cross-sectional views, respectively, of a microfluidic device of the prior art.
Figure 2:
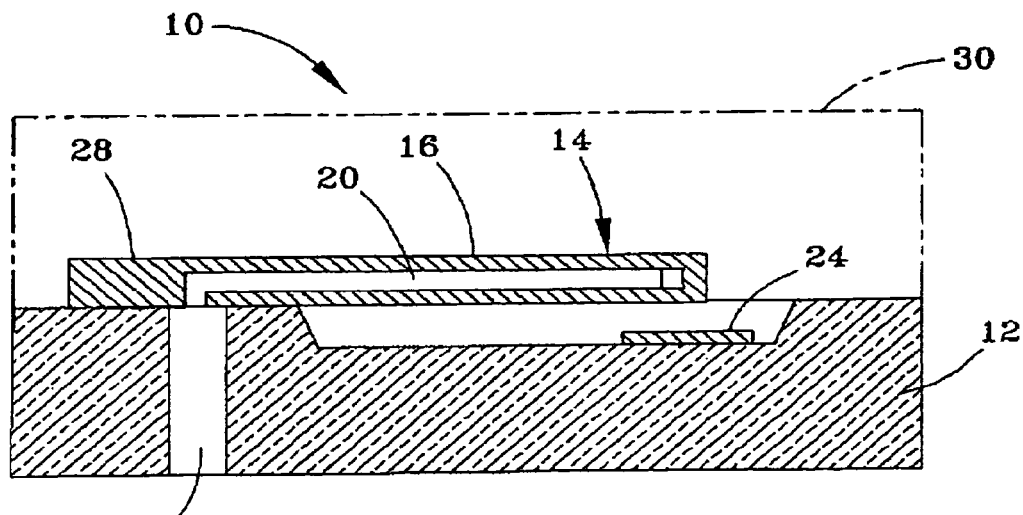

In FIG. 3, the microfluidic device 40 is represented as including a substrate 42 that may be formed of silicon or another semiconductor material, quartz, glass, ceramic, metal, a polymeric material, a composite material, etc. The freestanding structure 44 extends from a base 46 bonded to the substrate 42 so that the structure 44 is suspended above a surface 78 of the substrate 42, defining a gap between the structure 44 and substrate 42 that permits the structure 44 to deflect in a plane normal to the surface of the substrate 42, as evident from FIGS. 4 and 5. The surface 78 can be the result of etching an opening in the base 46 to expose the substrate 42 beneath, or can be further defined by a recess etched into the surface of the substrate 42. Electrodes 64 and 66 are shown as being located on the surface 78 of the substrate 42 directly beneath the freestanding structure 44, and electrically interconnected with bond pads 68 for transmitting input and output signals to and from the device 40. In FIG. 1, the electrode 64 is a drive electrode for inducing vibration in the freestanding structure 44, and the electrode 66 is a sensing electrode for sensing the position (deflection) of the freestanding structure 44 relative to the substrate 12, as discussed in more detail below. Bond pads 70 are also provided for ground contacts 72 connected to the base 46.

Figure 5:
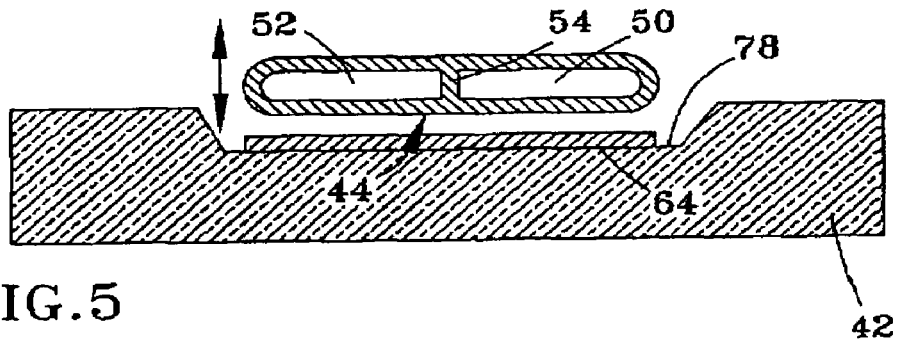

According to a preferred aspect of the invention, the freestanding structure 44 and base 46 are micromachined from silicon, doped silicon or another semiconductor material, though other materials can be used including but not limited to sapphire, quartz, or another glass material, ceramic materials, plastic, metallic materials, and composite materials. The freestanding structure 44 and base 46 can be micromachined together or individually and then bonded (for example, by fusion, direct, anodic, solder, eutectic, or adhesive bonding) as a unitary structure to the substrate 42. FIG. 3 shows the top of the freestanding structure 44 removed to expose its interior construction, which includes the continuous internal passage 48 defined by two straight and parallel channels 50 and 52 interconnected with a curved channel 51, such that the channels 50, 51, and 52 are in fluidic series. Though not required, the smooth and rounded shape of the curved channel 51 is preferred to reduce the trapping and nucleation of bubbles within the fluid present in the freestanding structure 44, the presence of which would degrade the performance of the device 40. The channels 50 and 52 are separated within the freestanding structure 44 by a single wall 54, whose opposite surfaces contact the fluid within the channels 50 and 52. As represented in FIGS. 3 and 5, the wall 54 is the only structure that separates the channels 50 and 52 within the freestanding structure 44, including the inlet and outlet of the freestanding member 44 coupled to inlet and outlet passages 56 and 58 micromachined in the base 46.

Figure 4:
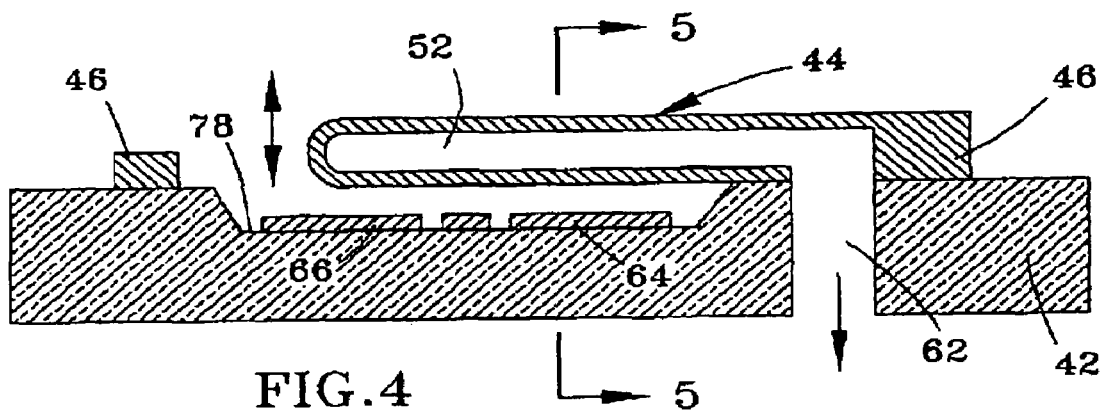
FIGS. 4 and 5 are cross-sectional views showing in greater detail a freestanding member of the microfluidic device of FIG. 3.

From FIGS. 3 through 5, it can be seen that fluid enters and leaves the freestanding structure 44 through the fluid inlet and outlet passages 56 and 58 within the base 46, and exit the device 40 through inlet and outlet ports 60 and 62 located in the substrate 42, for example, at the bottom surface of the substrate 42. As a result of this configuration, fluid enters the device 40 through the inlet port 60, flows through the inlet passage 56 to the freestanding structure 44, where the fluid enters the channel 50 and flows in a first direction toward the curved channel 51. The curved channel 51 reverses the flow direction of the fluid, such that fluid flow through the second channel 52 is opposite that of the first channel 50. From the channel 52, the fluid exits the freestanding structure 44 and enters the outlet passage 58 within the base 46, and exits the device 40 through the outlet port 62.

From the above, it should be understood that the internal passage 48 of the freestanding structure 44 can serve as a conduit through which a fluid flows while the cantilevered freestanding structure 44 is vibrated for the purpose of ascertaining certain properties of the fluid using Coriolis force principles, as explained in Tadigadapa et al. As indicated in FIGS. 4 and 5, the freestanding structure 44 is vibrated in a direction perpendicular to the surface 78 of the substrate 42, preferably at or near its resonant frequency. During half of the vibration cycle in which the freestanding structure 44 moves upward, the freestanding structure 44 has upward momentum as the fluid travels around the tube bends, and the fluid flowing out of the freestanding structure 44 resists having its vertical motion decreased by pushing up on that part of the freestanding structure 44 nearest the outlet passage 58. The resulting force causes the freestanding structure 44 to twist. As the freestanding structure 44 moves downward during the second half of its vibration cycle, the freestanding structure 44 twists in the opposite direction. This twisting characteristic is referred to as the Coriolis effect, and the degree to which the freestanding structure 44 deflects during a vibration cycle as a result of the Coriolis effect can be correlated to the mass flow rate of the fluid flowing through the freestanding structure 44, while the density of the fluid is proportional to the frequency of vibration and the damping and amplitude of the peak is proportional to the viscosity of the fluid.

The resonant frequency of the freestanding structure 44 is controlled by its mechanical design (shape, size, construction and materials). Typical resonant frequencies for the micromachined freestanding structure 44 represented in FIG. 3 will generally be in the range of about 1 kHz to about 100 kHz. The amplitude of vibration is adjusted through the drive electrode 64. In a preferred embodiment, the freestanding structure 44 is formed of doped silicon and can therefore serve as an electrode that can be capacitively coupled to the drive electrode 64, enabling the electrode 64 to capacitively (electrostatically) drive the freestanding structure 44. However, it is foreseeable that the freestanding structure 44 could be formed of a nonconductive material, and a separate electrode formed on the freestanding structure 44 opposite the drive electrode 64 for vibrating the freestanding structure 44 electrostatically. An alternative driving technique is to provide a piezoelectric element on an upper surface of the freestanding structure 44 to generate alternating forces in the plane of the freestanding structure 44 that flex the structure 44 in directions normal to the plane of the structure 44. Other alternatives are to drive the freestanding structure 44 magnetically, thermally, or by another actuation technique. In addition to sensing the deflection of the freestanding structure 44 relative to the substrate 42, the sensing electrode 66 provides feedback to the drive electrode 64 to enable the vibration frequency to be controlled with appropriate circuitry (e.g., 100 in FIGS. 12 and 13). The sensing electrodes 66 can sense the freestanding structure 44 capacitively or in any other suitable manner capable of sensing the proximity or motion of the structure 44.

A sealing ring 88 is represented in FIG. 3 as surrounding the freestanding structure 44 and base 46 to permit bonding of a capping wafer (not shown) to the substrate 42 to protect the freestanding structure 44. In the preferred embodiment of this invention, the bond between the cap and the substrate 42 is hermetic, and the enclosure formed by the cap is evacuated to enable the freestanding structure 44 to be driven efficiently at high quality (Q) values without damping. In such an embodiment, a getter material (not shown) is preferably placed in the enclosure to assist in reducing and maintaining a low cavity pressure.

The device 40 is also shown in FIG. 3 as including bond pads 74 to a temperature sensing element 76 for measuring the temperature of the fluid flowing through the freestanding structure 44. Properties such as densities of materials change with temperature, as do the Young's and shear moduli of materials. Placement of the temperature sensing element 76 on the substrate 42 enables the temperature of the freestanding structure 44 and its fluid contents to be monitored with suitable accuracy under many operating conditions. A suitable construction for the sensing element 76 can make use of one or more metal layers of the type employed to form the electrodes 68, 70, and 74, and their associated conductive runners. For example, a resistive-based temperature sensing element 86 can be formed by a thin-film metal layer of platinum, palladium or nickel, in accordance with known practices. With the temperature sensing element 76, changes in mechanical properties of the freestanding structure 44 and properties of the fluid therein attributable to temperature changes can be compensated for with appropriate circuitry (e.g., the circuitry 100 in FIGS. 12 and 13). Alternatively or in addition, an electrical potential could be applied to pass a current through the freestanding structure 44 to raise and maintain the temperature of the freestanding structure 44 and the fluid flowing therethrough by Joule heating, with the sensing element 76 used as feedback for appropriate control circuitry (not shown).

Figure 6:
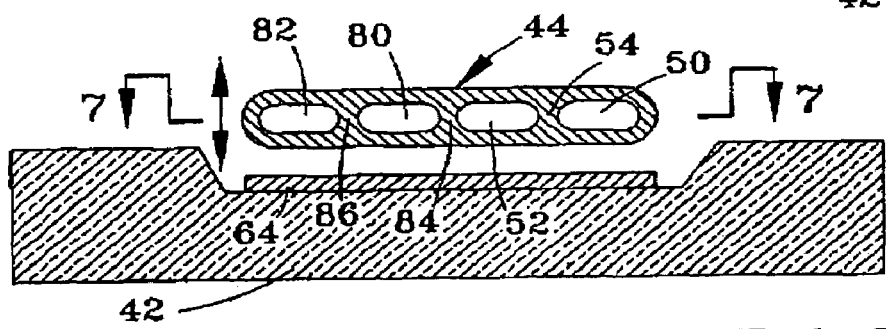
FIG. 6 is a cross-sectional view analogous to FIG. 5, but showing a freestanding member configured in accordance with a second embodiment of this invention.
Figure 7:
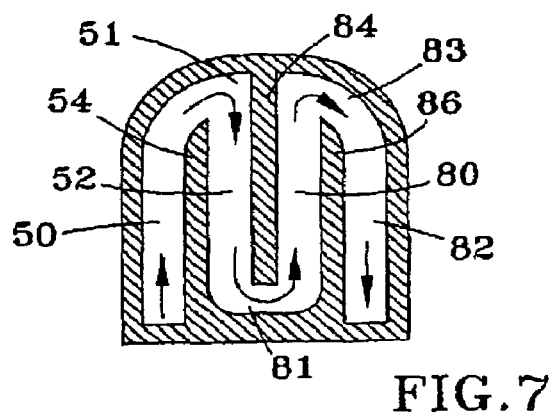
FIG. 7 is a plan view of the freestanding member of FIG. 6.

While the freestanding structure 44 is represented in FIGS. 3 through 5 as containing a single pair of straight and parallel channels 50 and 52, the structure 44 can be fabricated to contain any number channels. As an example, FIGS. 6 and 7 show the freestanding structure 44 modified to contain two additional straight channels 80 and 82 fluidically coupled to the channels 50 and 52 via a curved channel 81, and separated from the channels 50 and 52 by a wall 84. The channels 80 and 82 are fluidically coupled to each other via a curved channel 83, and separated from each other by an additional wall 86.

Figure 8:
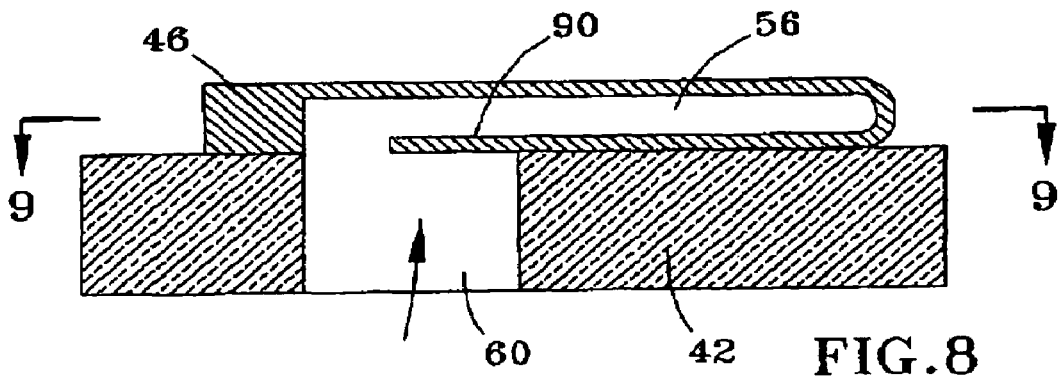
FIGS. 8 and 9 are cross-sectional and plan views, respectively, of an interface between a base member from which the freestanding member of FIG. 3 is cantilevered and an inlet port within the substrate to which the base member is bonded.
Figure 9:
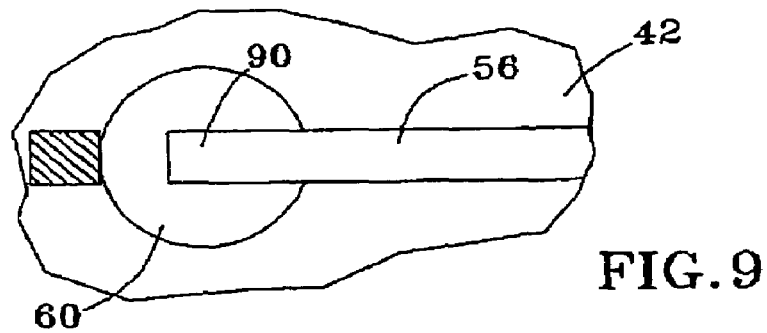
Figure 10:
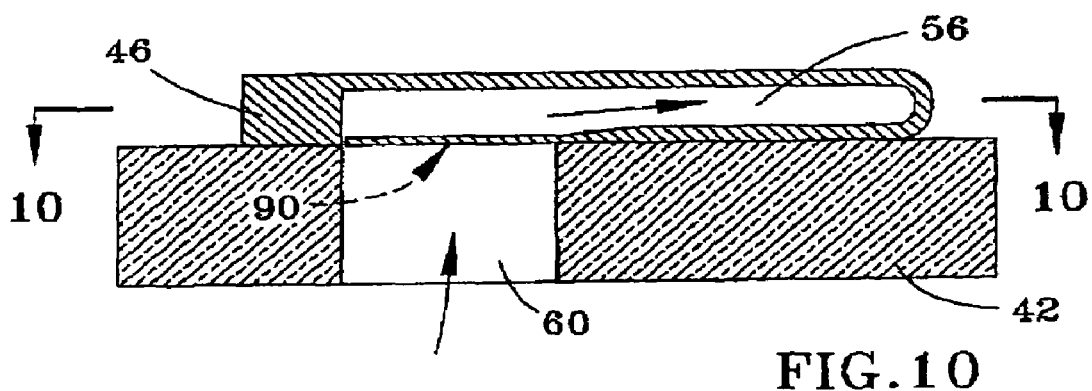
FIGS. 10 and 11 are alternative cross-sectional and plan views, respectively, of the interface between the base member and the inlet port of FIGS. 8 and 9.
Figure 11:
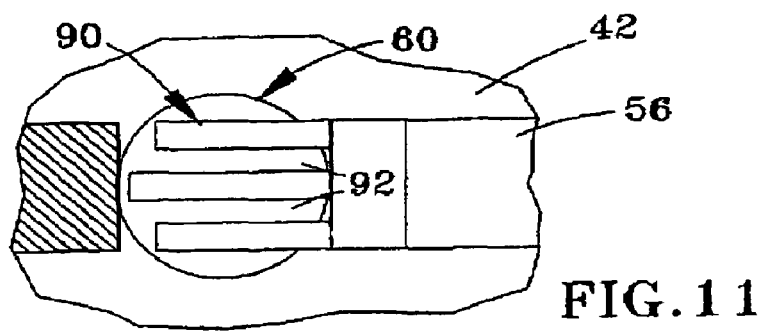

FIGS. 8 through 11 represent additional techniques for reducing the likelihood of bubbles being trapped, nucleated, or injected into the internal passage 48 of the freestanding structure 44. In FIGS. 8 and 9, the connection between the inlet passage 56 (within the base 46) and inlet port 60 (within the substrate 42) is shown. The inlet passage 56 is configured to be narrower in width than the inlet port 60, and to have a tubular extension 90 that projects transversely into the inlet port 60. As a result, bubbles entrained in the fluid entering the device 40 through the inlet port 60 tend to be trapped within the inlet port 60 and thereby prevented from entering the freestanding structure 44. Flow turbulence within the inlet port 60 tends to break up bubbles into finer ones that would have a much reduced negative effect on the performance of the freestanding structure 44. The embodiment of FIGS. 10 and 11 achieves a similar effect with the inlet passage 56 having roughly the same width as the inlet port 60 by forming slots 92 in the extension 90, effectively creating a sieve that can filter bubbles, trapping them in the inlet port 60 and/or breaking up larger bubbles.

Figure 12:
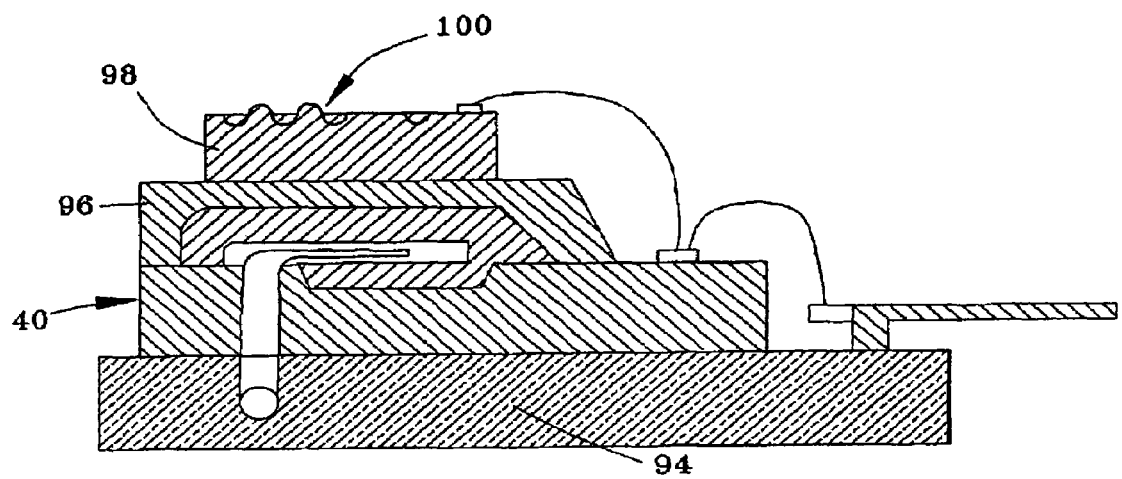
FIGS. 12 and 13 depict two packaging options for the microfluidic device of FIG. 3.
Figure 13:
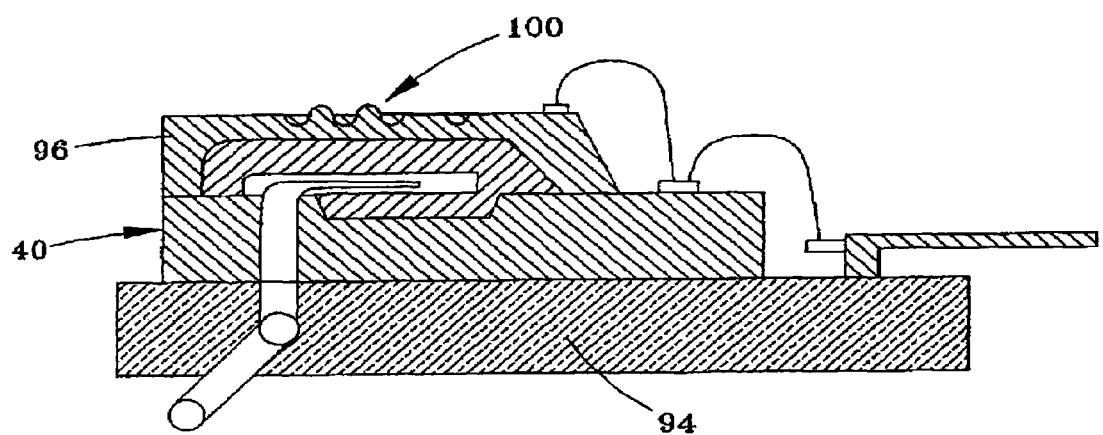

FIGS. 12 and 13 represent packaging techniques that capitalize on the miniaturization achieved with the freestanding structure 44. In FIGS. 12 and 13, the device 40 is shown mounted to a package header 94 and the freestanding structure 44 enclosed by a capping wafer 96 to form a MEMS package. In FIG. 12, a chip 98 carrying an application specific integrated circuit (ASIC) 100 for the device 40 is bonded to the top of the capping wafer 96, with wire bonds connecting the ASIC 100 to the bond pads 68, 70, and 74 on the device 40. In FIG. 13, a separate ASIC chip is omitted, and the ASIC 100 is formed directly in the surface of the capping wafer 96.

Figure 14:
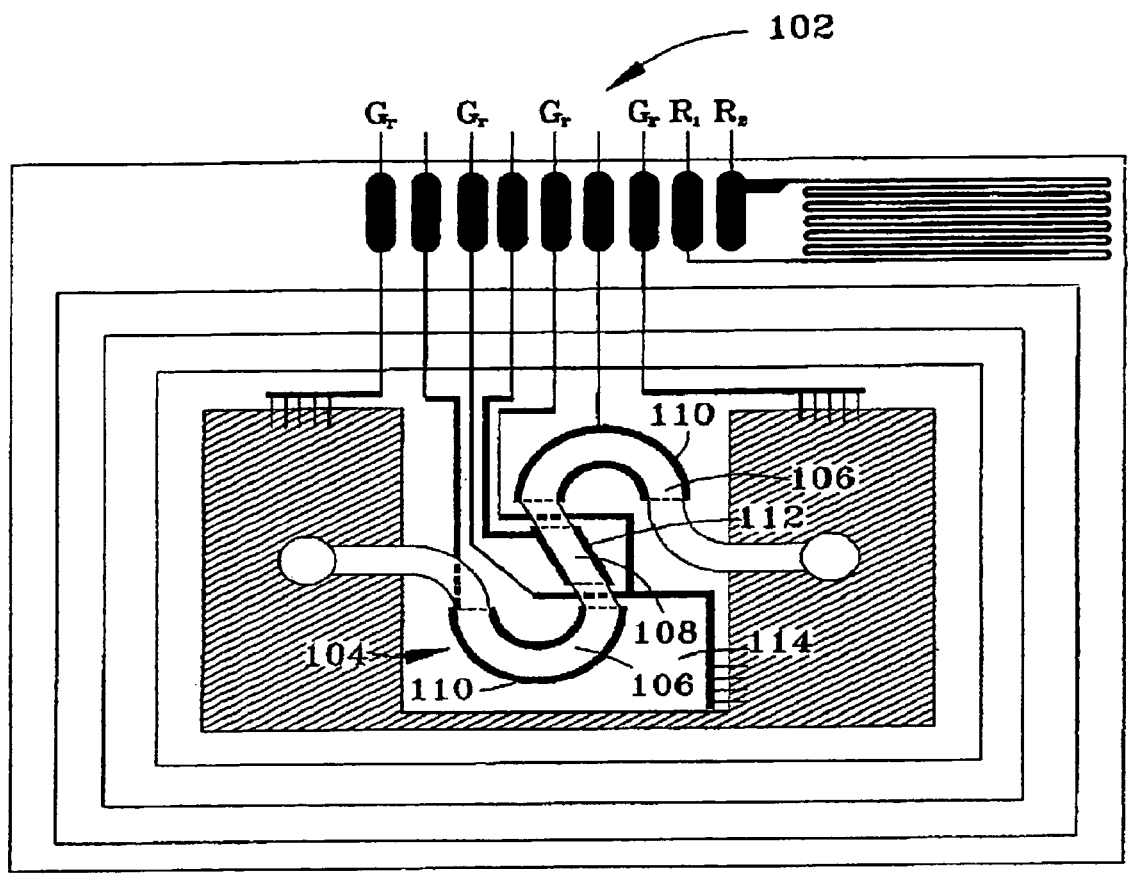
FIG. 14 depicts an alternative configuration for the microfluidic device of FIG. 3.
Figure 15:
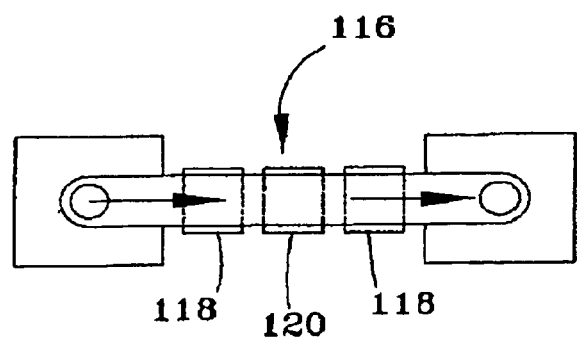
FIG. 15 depicts an alternative configurations for the freestanding member of FIGS. 3 and 14.

While the compact configurations shown in FIGS. 3 through 7 are preferred for the freestanding portion 44, other compact configurations are possible. As examples, FIG. 14 shows a microfluidic device 102 essentially similar to that of FIG. 3, but modified to have a freestanding structure 104 that is not cantilevered, and instead configured as an S-shaped tube. Drive electrodes 110 are placed under curved segments 106 of the freestanding structure 104, and a sensing electrode 112 is located beneath the generally straight intermediate segment 108 between the curved segments 106. The drive electrodes 110 are operated to cause the freestanding structure 104 to twist, causing the intermediate segment 108 to periodically deflect toward and away from the substrate surface 114 beneath the freestanding structure 104. FIG. 15 depicts another non-cantilevered freestanding structure 116 in the form of a straight tube with drive electrodes 118 beneath the ends of the tube and a sensing electrode 120 beneath the tube between the drive electrodes 118. Though achieving the smallest size for a freestanding structure, a straight tube is stiffer than the configurations shown in FIGS. 1 through 14 and therefore requires more amplification of the signal from the sensing electrode 120. Because higher sensitivity to twisting is key for Coriolis mass flow sensors, the higher sensitivity capabilities of the embodiments in FIGS. 3-14 are preferred.

The small chip size and low cost capability of the devices of this invention are extremely valuable for consumer and high-volume applications. For example, the devices represented in FIGS. 3 through 15 can be used in a wide variety of applications, including chemical concentration meters, drug concentration and type identification, sensing air bubble in drug delivery equipment, and other applications. Consistent with the teachings of commonly-assigned U.S. Patent Application Publication No. 2006/0175303, the devices of this invention can be used in fuel cell systems to sense the concentration of fuels in a fuel cell solution, such as a mixture of water and methanol, ethanol, ethylene glycol, isopropyl alcohol (IPA), formic acid, sulfuric acid, gasoline, or other organic liquid, and in combustion fuel systems to sense the concentrations in the fuel mixture, such as a mixture of gasoline and an alternative fuel such as ethanol (e.g., E85) or methanol (e.g., M85).

The devices can be modified in accordance with commonly-assigned U.S. Patent Application Publication No. 2006/0169038 and 2006/0213552 to be capable of operating in a bypass mode for use in relatively large flow rate systems, such as to monitor the concentration of chemicals in a small sample of a fluid. In this manner, the devices can be used to evaluate a variety of fluids used in vehicle fluid systems, such as fuels, intake air, lubricating oils, transmission, hydraulic and brake fluids, coolants, exhaust gases, window washing fluids, etc., for land-based, aquatic-based, and aerospace vehicles. Furthermore, a variety of fluid properties can be measured with the devices, including but not limited to flow rate (including mass and volumetric flow rates), density and properties that can be correlated to density, such as specific gravity, relative chemical concentrations of intended fluid constituents, and the presence of undesirable contaminants such as liquids (e.g., fuel or water in engine oil), gas or air bubbles (e.g., in a fuel or brake fluid), solid particles (e.g., in engine oil), etc.

While the invention has been described in terms of a particular embodiment, it is apparent that other forms could be adopted by one skilled in the art. Therefore, the scope of the invention is to be limited only by the following claims.

The invention claimed is:

1. A microfluidic device comprising:
   a substrate;
   a micromachined freestanding member supported by the substrate and spaced apart and separated from the substrate by a gap whereby the freestanding member is able to move relative to the substrate, the freestanding member having an inlet, an outlet, and an internal passage that fluidically couples the inlet and outlet, the freestanding member comprising a wall that defines and separates first and second passage portions of the internal passage that are arranged in fluidic series so that a fluid flowing through the internal passage flows through the first and second passage portions in opposite directions;
   means for vibrating the freestanding member; and
   means for sensing movement of the freestanding member relative to the substrate.

2. The microfluidic device according to claim 1, wherein the fluid contacts opposite surfaces of the wall as the fluid flows through the internal passage.

3. The microfluidic device according to claim 1, wherein the first and second passage portions are connected by an intermediate portion that redirects the flow direction of the fluid between the first and second passage portions by about 180 degrees.

4. The microfluidic device according to claim 1, wherein the wall also separates the inlet and outlet of the freestanding member.

5. The microfluidic device according to claim 1, wherein the first and second passage portions are substantially straight and parallel.

6. The microfluidic device according to claim 5, wherein internal passage consists essentially of the first and second passage portions and an intermediate portion that connects the first and second passage portions and redirects the flow direction of the fluid between the first and second passage portions by about 180 degrees.

7. The microfluidic device according to claim 1, wherein the internal passage comprises third and fourth passage portions that are arranged in fluidic series with the first and second passage portions so that a fluid flowing through the internal passage flows through the second and third passage portions in opposite directions and flows through the third and fourth passage portions in opposite directions.

8. The microfluidic device according to claim 7, wherein the first, second, third, and fourth passage portions are substantially straight and parallel.

9. The microfluidic device according to claim 7, wherein the first and second passage portions are connected by a first intermediate portion that redirects the flow direction of the fluid between the first and second passage portions by about 180 degrees, the second and third passage portions are connected by a second intermediate portion that redirects the flow direction of the fluid between the second and third passage portions by about 180 degrees, and the third and fourth passage portions are connected by a third intermediate portion that redirects the flow direction of the fluid between the third and fourth passage portions by about 180 degrees.

10. The microfluidic device according to claim 9, wherein the freestanding member further comprises a second wall that defines and separates the second and third passage portions of the internal passage.

11. The microfluidic device according to claim 10, wherein the freestanding member further comprises a third wall that defines and separates the third and fourth passage portions of the internal passage.

12. The microfluidic device according to claim 1, wherein the vibrating means and the sensing means are between the substrate and the freestanding member.

13. The microfluidic device according to claim 1, wherein the substrate has a first surface and an oppositely-disposed second surface, the freestanding member is an integrally micromachined extension of a base member bonded to the first surface, and the base member comprises inlet and outlet passages fluidically coupled to the inlet and outlet, respectively, of the internal passage within the freestanding member.

14. The microfluidic device according to claim 13, further comprising an inlet port fluidically coupled to the inlet passage of the base member, and means for inhibiting performance-degrading bubbles entrained in the fluid from entering the inlet passage of the base member.

15. The microfluidic device according to claim 14, wherein the inhibiting means comprises a tubular member that defines a portion of the inlet passage of the base member, protrudes into the inlet port, and has a smaller internal cross-section than the inlet port.

16. The microfluidic device according to claim 14, wherein the inhibiting means comprises a tubular member that defines a portion of the inlet passage of the base member and protrudes into the inlet port, and the tubular member comprises a sieve.

17. The microfluidic device according to claim 13, further comprising inlet and outlet ports located in the second surface of the substrate and fluidically coupled to the inlet and outlet passages, respectively.

18. The microfluidic device according to claim 1, further comprising a hermetically sealed cap bonded to the substrate so as to define a hermetically-sealed enclosure containing the freestanding member.

19. The microfluidic device according to claim 18, further comprising a second substrate bonded to the cap, and integrated circuitry defined in the second substrate and electrically coupled to the vibrating means and the sensing means.

20. The microfluidic device according to claim 18, further comprising integrated circuitry defined in the cap and electrically coupled to the vibrating means and the sensing means.

21. A microfluidic device comprising:
   a substrate;
   a micromachined freestanding member supported by the substrate and spaced apart and separated from the substrate by a gap whereby the freestanding member is able to move relative to the substrate, the freestanding member having an inlet, an outlet, and an internal passage that fluidically couples the inlet and outlet, the freestanding member comprising first and second portions that contain first and second arcuate passage portions of the internal passage and an intermediate portion containing an intermediate passage portion of the internal passage, the intermediate passage portion being between and in fluidic series with the first and second arcuate passage portions so that a fluid flowing through the internal passage flows through the inlet and the outlet of the freestanding member in a first direction and flows through the intermediate passage portion in a second direction substantially opposite to the first direction;

means for vibrating the first and second portions of the freestanding member; and means for sensing movement of the intermediate portion of the freestanding member relative to the substrate.

* * * * *